Jan. 29, 1963  D. E. COLVILL ETAL  3,076,098
ELECTRIC STARTING MOTOR CONTROL
Filed July 15, 1960  2 Sheets-Sheet 1

INVENTORS.
Donald E. Colvill
David S. Dennis
BY
C.R. Meland
Their Attorney

United States Patent Office 3,076,098
Patented Jan. 29, 1963

3,076,098
ELECTRIC STARTING MOTOR CONTROL
Donald E. Colvill, Anderson, and David S. Dennis, Chesterfield, Ind., assignors to General Motors Corporation, Detroit, Mich., a corporation of Delaware
Filed July 15, 1960, Ser. No. 43,046
13 Claims. (Cl. 290—36)

This invention relates to electric starting systems for motor vehicles and more particularly to a system wherein the starting motor is prevented from being energized when the engine or prime mover of the vehicle is in operation.

One of the objects of this invention is to provide an electric starting system for a motor vehicle engine wherein an electric cranking motor is provided to crank the engine of the vehicle and wherein the energization of the cranking motor is controlled by a switch, and further wherein means are provided for preventing energization of the cranking motor after the engine has started and also following the releasing or opening of the switch.

Another object of this invention is to provide an electric starting system for motor vehicles including an electric cranking motor that has its energizing circuit controlled by semi-conductor means, and further, wherein the conduction of the semi-conductor means is controlled by a manually operable switch and by the voltage output of a generator that is driven by the engine of the vehicle.

Still another object of this invention is to provide an electric starting system for cranking the engine of a motor vehicle wherein the electric cranking motor has its energization controlled by switch means that is in turn controlled by switch means that is in turn controlled by first and second semi-conductors, one of the semi-conductors having its conduction controlled by a manually operable switch and the other semi-conductor being connected with a generator that is driven by the vehicle engine.

Further objects and advantages of the present invention will be apparent from the following description, reference being had to the accompanying drawings wherein preferred embodiments of the present invention are clearly shown.

Figure 1:
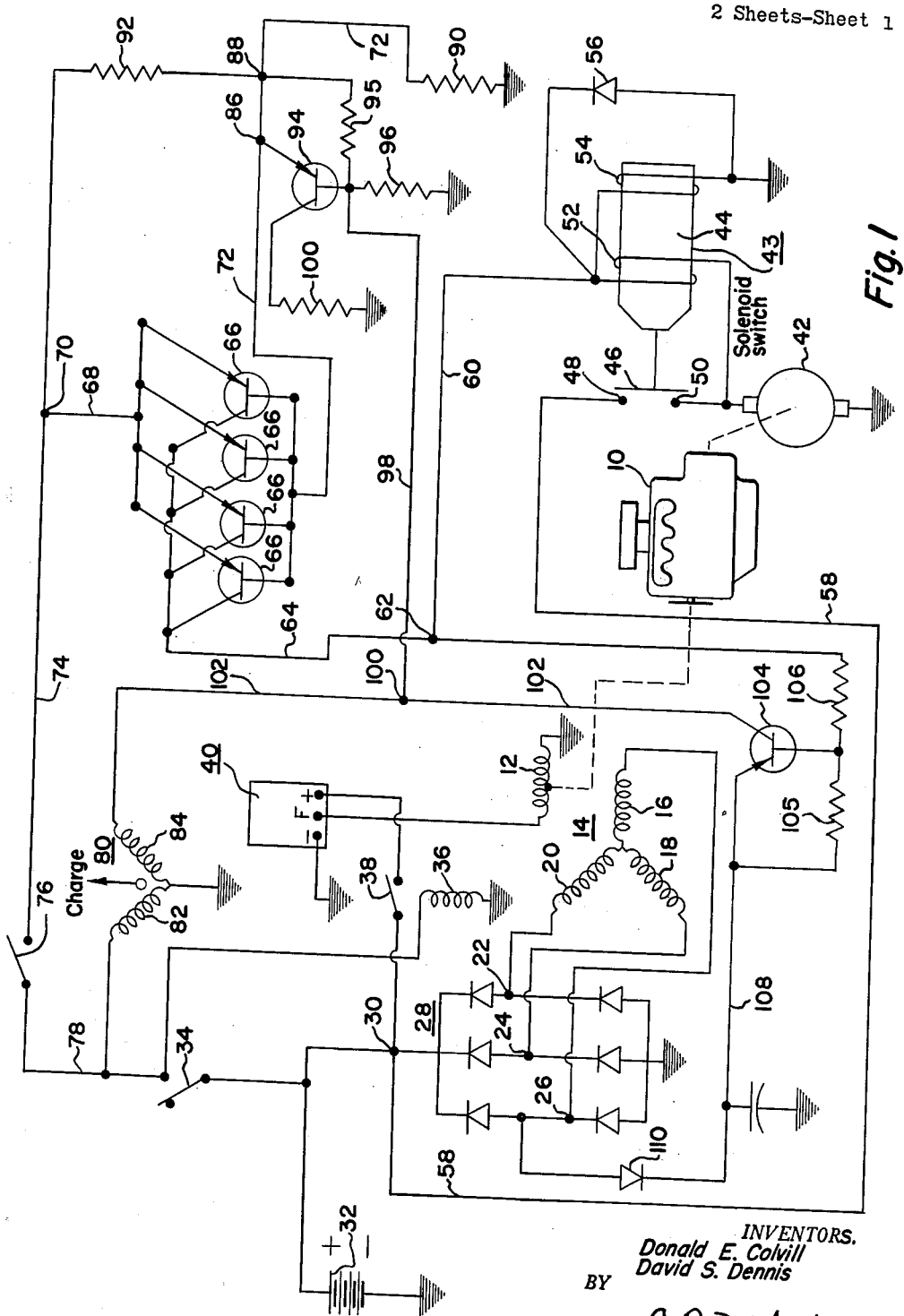
FIGURE 1 is a schematic circuit diagram of a starting motor control system made in accordance with this invention.

Referring now to the drawings and more particularly to FIGURE 1, the reference numeral 10 designates an engine which may be the prime mover of a motor vehicle. The engine 10 is mechanically connected with a rotor field winding 12 of an alternating current generator which is generally designated by reference numeral 14. The generator 14 has phase windings 16, 18 and 20. It can be seen that the phase windings are Y-connected to provide a three-phase output and that these phase windings are connected with the junctions 22, 24 and 26 which form the input terminals of a three-phase, full-wave bridge rectifier generally designated by reference numeral 28. One of the output terminals of the bridge rectifier 28 is connected directly to ground whereas the other output terminal is connected with the junction 30.

The junction 30 is connected to one side of a storage battery 32 and to one side of a manually operable switch designated by reference numeral 34. Where the engine 10 is a diesel engine, the switch 34 may be a run switch which is closed during operation of the engine and when it is desired to start the engine. The switch 34 is connected to one side of a relay coil 36 which pulls the contactor 38 to a closed position whenever the run switch 34 is closed.

The junction 30 is connected to one side of this relay operated contactor 38 and it is seen that this contactor controls the circuit between junction 30 and the positive terminal of a voltage regulator which is designated by reference numeral 40. The voltage regulator has a field terminal connected to one side of the field winding 12 of generator 14 and has a negative terminal which is connected directly to ground. The regulator may be of any type that is known to those skilled in the art and its specific construction forms no part of the present invention.

The reference numeral 42 designates an electric starting motor which is mechanically coupled to crank the engine 10. This mechanical coupling may include a shiftable pinion, not shown, and may include an over-running clutch. The energizing circuit for the starting motor 42 is controlled by a solenoid 43 having an armature 44 which shifts the contactor 46 into engagement with contacts 48 and 50 whenever the solenoid windings 52 and 54 are energized. The solenoid winding 54 is a hold-in winding whereas the solenoid winding 52 is a pull-in winding. A rectifier 56 is connected across the hold-in winding 54. The armature 44 in some starting motor devices may shift the pinion of a starter drive into mesh with the ring gear of the engine 10. In other devices the solenoid 44 may only close the circuit for the starting motor 42, the starting motor then rotating to cause a meshing of the pinion with the ring gear. The specific type of starting motor employed forms no part of the present invention and it is therefore not described or shown in detail herein. It can be seen that whenever the contactor 46 connects the contacts 48 and 50 a circuit is made from junction 30 through the starting motor 42 via the lead wire 58.

The solenoid coil windings 52 and 54 are energized from a circuit that includes the lead wire 60, the junction 62 and the lead wire 64. It can be seen that the lead wire 64 is connected with the collector electrodes of four parallel connected transistors which are individually designated by reference numeral 66. The transistors are of the PNP type and have their emitter electrodes connected with the lead wire 68 which is in turn connected with junction 70. The base electrodes of transistors 66 are connected with the lead wire 72. It can be seen that the junction 70 is connected with a lead wire 74 and that this lead wire is connected to one side of a start switch designated by reference numeral 76. The opposite side of the start switch is connected with one side of the run switch 34 via the lead wire 78. The lead wire 78 is also connected to one side of a charge indicator generally designated by reference numeral 80 and having coil windings 82 and 84 which are connected together at one end thereof and directly to ground.

The lead wire 72 that is connected with the base electrodes of transistors 66 is connected to junctions 86 and 88 and is connected to ground through a resistor 90. The junction 88 is connected with junction 70 via the resistor 92. The junction 86 is connected with the emitter electrode of a PNP transistor 94. The base electrode of transistor 94 is connected to ground through the resistor 96 and is also connected with the lead wire 98. The collector electrode of transistor 94 is connected to ground through the resistor 100.

The lead wire 98, which is connected with the base electrode of transistor 94, is connected with a junction 100. The junction 100 is connected with lead wire 102 which is in turn connected to one side of the coil winding 84 of charge indicator 80 and is also connected to the collector electrode of a PNP transistor 104. The base electrode of transistor 104 is connected with junction 62 through a resistor 106. The emitter electrode of transistor 104 is connected with lead wire 108 and therefore to one side of rectifier 110. The opposite side of the rectifier 110 is connected with the junction 26 of the bridge rectifier 28.

In operation and assuming that the operator of the motor vehicle desires to crank the engine 10 to start the same, the run switch 34 is closed. When switch 34 is closed it can be seen that the relay coil 36 will be energized from battery 32 to cause a closure of the relay operated contact 38. With contact 38 closed, a circuit is completed for energizing the field winding 12 of the alternator 14 via junction 30, contactor 38 and the voltage regulator 40. In this condition of operation, the coil winding 82 of the charge indicator 80 will also be energized and the charge indicator will show a discharging condition of the battery.

If the start switch 76 is now closed, it can be seen that the emitter electrode of transistor 94 will be at a positive potential due to its connection with the positive side of battery 32 via switch 34, switch 76, lead wire 74, resistor 92, junction 88 and junction 86. Since the base electrode of transistor 94 is now at essentially ground potential, there will be a current flow between the emitter and base of transistor 94 as a result of the closure of start switch 76. This will cause an emitter to collector current in transistor 94. With the turning on of transistor 94, it will be apparent that there will be a current path through the emitter to base circuits of transistors 66 via junction 70, lead wire 68, the emitter electrodes of transistors 66, through the base electrodes of transistors 66, through lead wire 72, thence to junction 86 and through the emitter to collector circuit of transistor 94. It thus is seen that the turning on of transistor 94 causes emitter to base current flow in transistors 66.

With emitter to base current flowing through the transistors 66, there will be a large emitter to collector current which is supplied to the pull-in winding 52 and the hold-in winding 54 to cause the armature 44 to shift. This shifting of the armature will cause a meshing of the pinion that is driven by starting motor 42 with the ring gear of engine 10 and will also cause the contacts 48 and 50 to be connected by the shiftable contactor 46. With contacts 48 and 50 connected current is supplied to the motor from battery 32, through junction 30, through lead wire 58 and thence through the contactor 46 to the starting motor 42.

The engine will now begin to be cranked by the starting motor and as it is cranked there may be an output voltage developed by the generator 14 which is rectified by the bridge rectifier 28. An output voltage will also be taken off the bridge rectifier between junction 26 and ground, the positive side of which is applied to the emitter electrode of transistor 104. At this time, the base electrode of transistor 104 is at positive battery potential and it is therefore seen that the potential of the base electrode of transistor 104 will exceed that of the emitter electrode. Under this condition of operation, there will be no emitter to collector current flow in transistor 104 so that cranking of the engine will continue even though an output voltage is being developed by generator 14.

Once the engine has started, the operator releases or opens the start switch 76. The opening of start switch 76 disconnects the emitter electrode of transistor 94 from positive potential and therefore causes this transistor to become substantially fully non-conductive. With transistor 94 substantially fully non-conductive, there is no emitter to collector current in transistor 66 since its base circuit has been essentially opened. With transistor 66 non-conductive, the solenoid windings 52 and 54 are de-energized so that the armature 44 shifts under the pressure of a spring or the like to cause the contacts 48 and 50 to be disconnected.

With the engine now operating, the rectifier 28 has an output voltage between junction 30 and ground which is determined by the setting of voltage regulator 40. There also is an output voltage appearing between junction 26 and ground. This voltage appearing between junction 26 and ground is now applied across the emitter and base electrodes of transistor 104 since the emitter electrode is connected with junction 26 through rectifier 110 and the base electrode of this transistor is now connected to ground through the solenoid coil winding 54. Since there now is a difference in potential between the emitter and base electrodes of transistor 104, it will conduct between the emitter and base causing an emitter to collector current flow. It can be seen that with the transistor 104 conducting between emitter and collector the base electrode of transistor 94 will now be at a positive potential with respect to the emitter. It therefore is apparent that the transistor 94 will be maintained non-conducive to prevent the conduction of transistors 66 during the time that the engine is operating and assuming, of course, that the switch 76 has been opened following a starting of the engine. It, therefore, can be seen that if the start switch 76 is now closed, the coil windings 52 and 54 will not be energized since the potential of the base electrode of transistor 94 is sufficiently positive to prevent conduction of transistor 94 between its emitter and base and therefore between emitter and collector. It accordingly can be seen that it is impossible to cause a cranking of the engine once the engine has started and once the switch 76 has been opened.

It is apparent that the emitter to base current flowing through transistor 104 and through the solenoid coil winding 54 to ground is not sufficient to cause a closure of contacts 48 and 50 nor a meshing of the pinion with the ring gear when the transistor 104 is biased to conduction by the output of the generator-rectifier combination.

It is pointed out that conduction of transistor 104 between emitter and collector also energizes the coil winding 84 of the charge indicator 80. It can be seen that the current flowing through coil winding 84 will have an opposing effect to the current flowing through coil winding 82 and therefore the charge indicator will now indicate that charging current is being supplied to the battery. In this connection, it is pointed out that the coil windings 82 and 84 are of the required number of turns and are wound in such a direction as to provide this charge indication. This will, of course, require that the charge indicating needle be shifted magnetically when the coil windings 82 and 84 are energized, which requires that magnetic forces be set up when either or both of the coil windings 82 and 84 are energized to provide the correct charge indication.

It is to be pointed out that in the arrangement of FIGURE 1 a static system is illustrated for controlling the flow of current to the coil windings 52 and 54. In other words, no switch contacts are used for controlling this current since this current is controlled by the parallel connected transistors 66.

Figure 2:
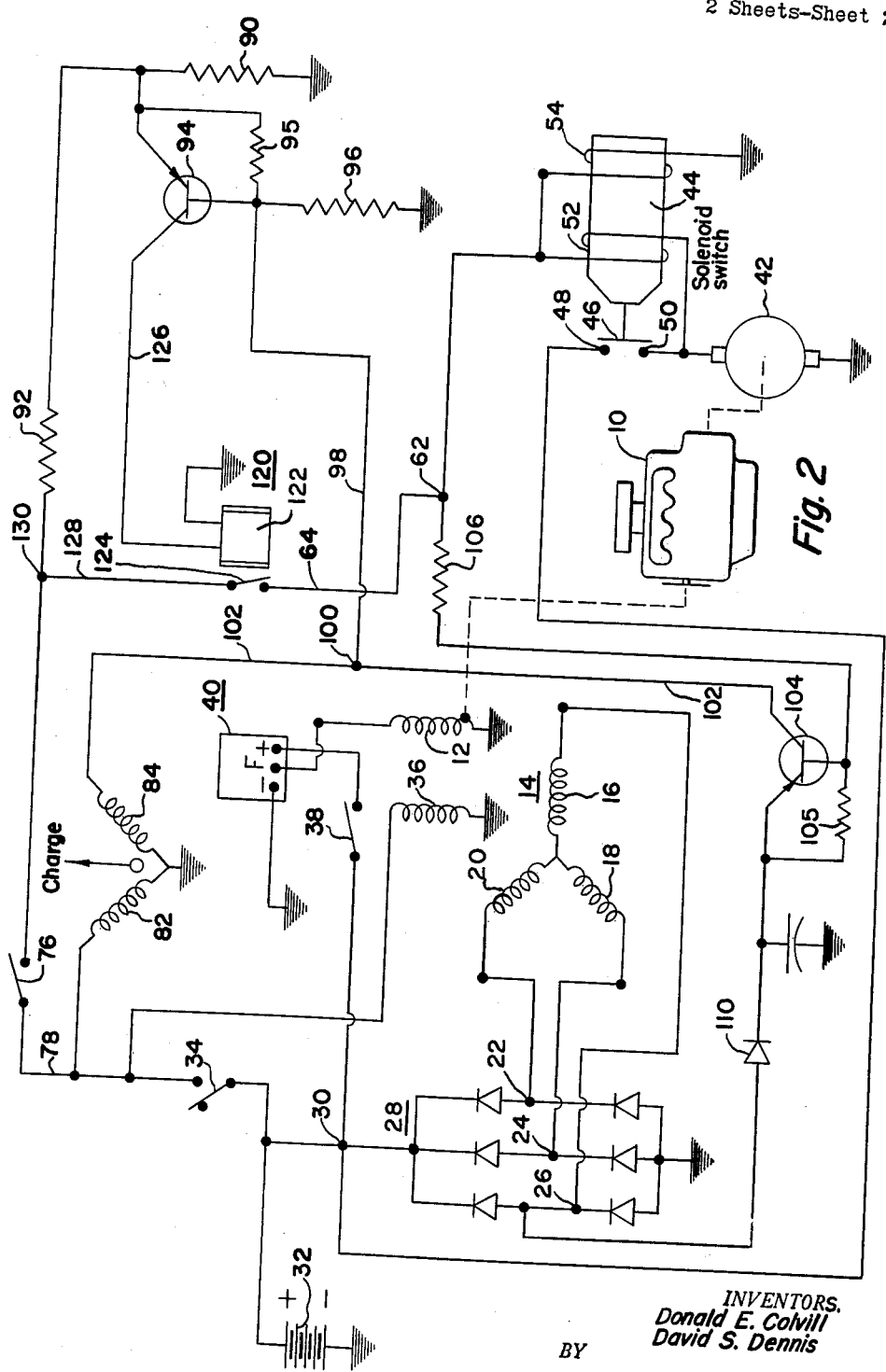
FIGURE 2 is a schematic circuit diagram of a modified arrangement for controlling the energization of an electric starting motor.

Referring now more particularly to FIGURE 2, a modified electric starting control arrangement is illustrated. The circuit of FIGURE 2 is in many respects identical with the circuit of FIGURE 1, and therefore identical reference numerals have been used in each figure to identify the same parts. In FIGURE 2, a relay generally designated by reference numeral 120 is employed for controlling the energization circuit for solenoid coils 52 and 54 rather than the parallel-connected transistors 66. The relay 120 includes a relay coil winding 122 which operates the contactor 124. The contactor is normally open but will be closed whenever the relay coil 122 is energized. It can be seen that one side of the relay coil 122 is connected to ground whereas the opposite side of this relay coil is connected with the collector electrode of transistor 94 via the lead wire 126. It can be seen that the emitter and base electrodes of transistor 94 are connected in the circuit in the same fashion as they were in FIGURE 1. The relay contactor 124 is connected between the lead wire 64 and the lead wire 128 which connects with junction 130.

The operation of the circuit of FIGURE 2 is identical with that of FIGURE 1 with the exception that the relay 120 controls the circuit for the solenoid coil windings 52 and 54. In other words, upon initial cranking of the engine with both the run switch 34 and start switch 76 closed, the transistor 94 is biased to a state of full conduction, therefore, energizing the relay coil winding 122 and causing the contactor 124 to shift to a closed position. This, of course, will provide an energization path for the coil windings 52 and 54 to commence the cranking of the engine. After the engine has started and providing that the start switch 76 has been opened, the base of transistor 94 is once more at a positive potential due to the conduction of transistor 104 between emitter and collector to therefore prevent the energization of the relay coil 122 and therefore prevent energization of the starting motor 42 and any cranking of the engine.

While the embodiments of the present invention as herein disclosed constitute preferred forms, it is to be understood that other forms might be adopted.

What is claimed is as follows:

1. In an electric starting system for cranking an internal combustion engine, the combination comprising, a generator, a storage battery, a charging circuit interconnecting said generator and said storage battery for supplying charging current to said battery, an electric starting motor adapted to crank said engine, control means, a manually operable switch, switch means connected between said charging circuit and said starting motor for controlling the energization of said starting motor, means for causing said switch means to close upon closure of said manually operable switch to complete a circuit between said charging circuit and said starting motor, and means connecting one side of said control means with said generator, said switch means when conductive connecting the opposite side of said control means with said charging circuit whereby said control means is rendered non-conductive, said control means being rendered conductive when said manually operable switch is opened to place a potential on one side of said switch means to render said switch means non-conductive.

2. In an electric starting system for cranking the engine of a motor vehicle, the combination comprising, a generator, a storage battery, a charging circuit connecting said generator and said battery, an electric starting motor for cranking said engine, semi-conductor switch means connected between said charging circuit and said starting motor for controlling the energization of said starting motor, a manually operable switch, and means for controlling the conduction of said semi-conductor switch means in response to opening and closing of said switch and in response to the output voltage of said generator.

3. In an electric starting system for cranking an internal combustion engine, the combination comprising, a generator, a storage battery, a charging circuit connecting said generator and said storage battery, an electric starting motor for cranking said engine, means interconnecting said generator and said engine whereby said engine drives said generator, semi-conductor switch means connected between said charging circuit and said starting motor for controlling the energization of said starting motor, and means connecting said generator and semi-conductor switch means whereby the conduction of said semi-conductor switch means is controlled in accordance with the output voltage of said generator.

4. In an electric starting system for cranking an internal combustion engine, the combination comprising, a generator, a storage battery, a charging circuit connecting said generator and said storage battery, an electric starting motor for cranking said engine, means connecting said engine and said generator whereby said generator is driven by said engine, control switch means connected between said charging circuit and said starting motor for controlling the energization of said starting motor, first semi-conductor switch means, a manually operable switch, means interconnecting said control switch means, said first semi-conductor switch means and said manually operable switch means whereby said control switch means is rendered conductive when said manually operable switch means is closed, second semi-conductor switch means, and means connecting said second semi-conductor switch means with said generator and with first semi-conductor switch means whereby said control switch means is rendered non-conductive when said generator is developing an output voltage.

5. In an electric starting system for cranking an internal combustion engine, the combination comprising, a generator, a storage battery, a charging circuit connecting said generator and storage battery, an electric starting motor for cranking said engine, means connecting said engine and said generator whereby said engine drives said generator, control switch means connected between said charging circuit and said starting motor for controlling the energization of said starting motor, a manually operable switch, a first transistor, means biasing said first transistor to a state of conduction when said manually operable switch is closed, means interconnecting said first transistor and said control switch means whereby said control switch means is rendered conductive when said first transistor is conductive, a second transistor, means connecting the emitter electrode of said second transistor with said generator, means connecting the collector electrode of said second transistor with the base electrode of said first transistor, and means connecting the base electrode of said second transistor to one side of said control switch means.

6. In an electric starting system for cranking an internal combustion engine, the combination comprising, a generator, a storage battery, a charging circuit connecting said generator and said storage battery, an electric starting motor for cranking said engine, means connecting said engine and said generator whereby said engine drives said generator, control switch means connected between said charging circuit and said starting motor for controlling the energization of said starting motor, first semi-conductor switch means, a manually operable switch, means connecting said manually operable switch between said charging circuit and said first semi-conductor switch means whereby said semi-conductor switch means is rendered conductive when said manually operable switch is closed, means connecting said control switch means and said first semi-conductor switch means for controlling the conduction of said control switch means, second semi-conductor switch means, and means connecting said second semi-conductor switch means with said first semi-conductor switch means and with said generator whereby said first semi-conductor switch means is rendered non-conductive when said generator is developing an output voltage.

7. In an electric starting system for cranking an internal combustion engine, the combination comprising, a generator, a storage battery, a charging circuit connecting said generator and storage battery, an electric starting motor for cranking said engine, means connecting said engine and said generator whereby said generator is driven by said engine, a plurality of parallel-connected transistors connected between said charging circuit and said starting motor for controlling the energization of said starting motor, a manually operable switch, a first transistor, means connecting said manually operable switch with said charging circuit and with said first transistor whereby said first transistor is rendered conductive between emitter and collector when said manually operable switch is closed, means connecting the emitter to collector circuit of said first transistor with the base circuits of said parallel-connected transistors whereby said parallel-connected transistors become conductive when said first transistor is conductive, a second transistor, means connecting the emitter electrode of said second transistor with said generator, means connecting the collector electrode of said second transistor with the base electrode of said first transistor, and means connecting the base electrode of said second transistor with the collector electrodes of said parallel-connected transistors.

8. In an electric starting system for cranking an internal combustion engine, the combination comprising, a generator, a storage battery, a charging circuit connecting said generator and storage battery, an electric starting motor for cranking said engine, means connecting said engine and said generator whereby said engine drives said generator, relay means including an actuating coil and shiftable switch means, means connecting said switch means between said charging circuit and said starting motor for controlling the energization of said starting motor, first semi-conductor switch means, means connecting said relay actuating coil with said first semi-conductor switch means whereby said actuating coil is energized when said first semi-conductor switch means is conductive, second semi-conductor switch means, and means connecting said second semi-conductor switch means with said generator and with said first semi-conductor switch means.

9. In an electric starting system for cranking an internal combustion engine, the combination comprising, a generator, a storage battery, a charging circuit connecting said generator and storage battery, an electric starting motor for cranking said engine, means connecting said engine and said generator whereby said engine drives said generator, relay means including a relay actuating coil and shiftable switch means, means connecting said shiftable switch means between said charging circuit and said starting motor whereby the energization of said starting motor is controlled by said shiftable switch means, a first transistor, means connecting the actuating coil of said relay means with the emitter to collector circuit of said first transistor, a manually operable switch, means interconnecting said manually operable switch, said charging circuit and said first transistor whereby said first transistor is rendered conductive between emitter and collector when said manually operable switch is closed, a second transistor, means connecting the emitter electrode of said second transistor with said generator, means connecting the collector electrode of said second transistor with the base electrode of said first transistor, and means connecting the base electrode of said second transistor to one side of said shiftable switch means.

10. In an electric starting system for cranking an internal combustion engine, the combination comprising, an A.C. generator, a storage battery, rectifier means connected with said A.C. generator, a charging circuit connecting said rectifier means with said storage battery, an electric starting motor for cranking said engine, means connecting said engine and said A.C. generator whereby said generator is driven by said engine, control switch means connected between said charging circuit and said starting motor for controlling the energization of said starting motor, a manually operable switch, first semi-conductor switch means connected with said control switch means and said manually operable switch for controlling the conduction of said control switch means, and second semi-conductor switch means connected with said rectifier means and with said first semi-conductor switch means for causing said control means to be non-conductive when said generator is developing an output voltage.

11. In an electric starting system for cranking an internal combustion engine, the combination comprising, an A.C. generator, rectifier means connected with said generator, a storage battery, a charging circuit connecting said rectifier means and said storage battery, an electric starting motor for cranking said engine, means connecting said A.C. generator and said engine whereby said engine drives said generator, semiconductor switch means connected between said charging circuit and said starting motor for controlling the energization of said starting motor, and control means connected with said rectifier means and with said semi-conductor switch means for rendering said semi-conductor switch means non-conductive when said generator is developing an output voltage.

12. In an electric starting system for cranking an internal combustion engine, the combination comprising, a generator, a storage battery, a charging circuit connecting said generator and said storage battery, an electric starting motor for cranking said engine, means connecting said engine and said generator whereby said engine drives said generator, control switch means connected between said charging circuit and said starting motor for controlling the energization of said starting motor, means including manually operable switch means connected with said charging circuit and said control switch means for causing said control switch means to be conductive when said manually operable switch means is closed, means maintaining said control switch means closed when said manually operable switch means is closed and when said engine is cranking said generator to develop an output voltage, and means connected with said generator for preventing said control switch means from closing when said manually operable switch means is open and said engine is driving said generator to develop an output voltage.

13. In an electric starting system for cranking an internal combustion engine, the combination comprising, an electric starting motor adapted to crank said engine, a generator connected to be driven by said engine, a power source, a storage battery, a charging circuit connecting said generator and said storage battery, control switch means connected between said starting motor and said charging circuit for controlling the energization of said starting motor, manually operable switch means, means operating in response to the closure of said manually operable switch means for causing said control switch means to complete a circuit for said starting motor, means operating in response to the generation of a voltage by said generator for rendering said control switch means non-conductive, and means for maintaining said control means conductive when said cranking motor is cranking said engine to develop an output voltage from said generator.

References Cited in the file of this patent

UNITED STATES PATENTS 1,920,782  Christian _____ Aug. 1, 1933